United States Patent [19]

Ogata

[11] Patent Number: 5,781,332
[45] Date of Patent: Jul. 14, 1998

[54] VARIABLE WAVELENGTH OPTICAL FILTER

[75] Inventor: Takaaki Ogata, Tokyo, Japan

[73] Assignee: NEC Corporation, Tokyo, Japan

[21] Appl. No.: 707,526

[22] Filed: Sep. 4, 1996

[30] Foreign Application Priority Data

Sep. 4, 1995 [JP] Japan .................... 7-226584

[51] Int. Cl.$^6$ ........................................ G02F 1/33
[52] U.S. Cl. ............ 359/308; 359/559; 359/578; 356/346; 356/352; 385/33
[58] Field of Search .................... 359/559, 305, 359/308, 307, 578; 356/352, 346, 416; 385/49, 33, 39, 41, 123

[56] References Cited

U.S. PATENT DOCUMENTS

| | | | |
|---|---|---|---|
| 3,681,608 | 8/1972 | Derderian et al. | 359/578 |
| 3,740,144 | 6/1973 | Walker | 359/578 |
| 3,914,055 | 10/1975 | Wolga et al. | |
| 4,448,486 | 5/1984 | Evans | 356/352 |
| 4,482,248 | 11/1984 | Papuchon et al. | 358/352 |
| 4,508,964 | 4/1985 | Gunning, III et al. | 356/352 |
| 5,040,862 | 8/1991 | Burton et al. | 385/33 |
| 5,225,888 | 7/1993 | Selwyn et al. | 356/346 |

FOREIGN PATENT DOCUMENTS 0 608 900 A1  8/1994  European Pat. Off.
0 638 788 A1  2/1995  European Pat. Off.

OTHER PUBLICATIONS

Suemura et al. (1993) "A Newly Developed Adaptive Wavelength Tunable Filter for Wavelength Selective Optical . . . " *Proc. of European Conf. on Optical Comm. Papers of Swiss Elect. Assn.* 2: 433–436.

*Primary Examiner*—Loha Ben
*Attorney, Agent, or Firm*—Scully, Scott, Murphy & Presser

[57] ABSTRACT

In a variable wavelength optical filter, a lens (3) is positioned at the output end of a first optical fiber (1) and transforms an input optical signal to parallel light. A dielectric interference optical filter (8) is located at the rear of the lens (3) in order to transmit only the light of particular wavelength. A lens (4) converges the light output from the filter (8) into the input end of a second optical fiber (2). A rotary plate (7) is affixed to the output shaft (6) of a servo motor (5) whose rotation angle is controlled by an electric signal fed from the outside of the filter. The filter (8) is mounted on the rotary plate (7) with the intermediary of a piezoelectric element or elements (9). The piezoelectric elements (9) are caused to oscillate by a modulating signal, so that the transmission center wavelength of the filter is varied. The resulting deviation of the transmission center frequency is detected.

1 Claim, 5 Drawing Sheets

A : OPTICAL AXIS
1,2 : OPTICAL FIBER
3,4 : LENS
5 : SERVO MOTOR
6 : OUTPUT SHAFT
7 : ROTARY PLATE
8 : DIELECTRIC LAMINATE FILM OPTICAL FILTER
9 : PIEZOELECTRIC ELEMENT

20 : VARIABLE WAVELENGTH FILTER OF THE INVENTION
21 : PHOTOCOUPLER
22 : PHOTODIODE
23 : OSCILLATOR
24 : MULTIPLIER
25 : CONTROL
26 : PHASE ERROR SIGNAL
27 : MODULATING SIGNAL
28 : FILTER ANGLE CONTROL SIGNAL

A : OPTICAL AXIS
1,2 : OPTICAL FIBER
3,4 : LENS
5 : SERVO MOTOR
6 : OUTPUT SHAFT
7 : ROTARY PLATE
8 : DIELECTRIC LAMINATE FILM OPTICAL FILTER
9 : PIEZOELECTRIC ELEMENT $\theta_{1,2}$ : ROTATION ANGLE TO OPTICAL AXIS
$\Delta\theta$ : ANGULAR DISPLACEMENT CAUSED BY PIEZOELECTRIC ELEMENT
$\lambda_{1,2}$ : TRANSMISSION CENTER WAVELENGTH
$\Delta\lambda$ : DISPLACEMENT OF CENTER WAVELENGTH
$D_{1,2}$ : LAMINATE FILM THICKNESS IN OPTICAL AXIS DIRECTION
$\Delta D$ : DISPLACEMENT OF LAMINATE FILM THICKNESS IN OPTICAL AXIS DIRECTION

VARIABLE WAVELENGTH OPTICAL FILTER

BACKGROUND OF THE INVENTION

The present invention relates to a variable wavelength optical filter for selecting an optical signal in an optical communication system.

The key to large capacity, long distance optical communication is an optical filter capable of selecting any desired wavelength out of a wavelength division multiplexed optical signal, and of separating only a signal wavelength from an optical signal buried in noise light. Particularly, a variable wavelength optical filter capable of varying the transmission wavelength, as desired, in response to an electric signal fed from the outside has been proposed and implemented in various forms.

A conventional variable wavelength optical filter includes a lens to which an optical signal is input. The lens transforms the optical signal to parallel light. The parallel light is incident to a dielectric interference optical filter. This filter is mounted on a rotary plate affixed to the output shaft of a servo motor. The angle of the filter to the input optical signal is variable in response to an electric signal fed from the outside of the filter. A change in the angle of the filter to the optical signal causes the thickness of the filter to change in the direction of optical axis, resulting in a change in transmission wavelength. Stated another way, the wavelength to be transmitted can be tuned by the electric signal fed to the filter from the outside. The optical signal selected by the filter is again converged by another lens into an optical fiber.

When the above variable wavelength optical filter is applied to an optical communication apparatus, it is necessary that the transmission center wavelength constantly follows the center wavelength of the optical signal. To so control the optical filter, there is available a maximum value control system which modulates the transmission center wavelength at a high speed and detects an error signal based on the resulting variation of transmitted light intensity with respect to a control voltage signal. However, the problem with the conventional motor-driven optical filter is that because the angle is varied mechanically, the transmission center wavelength cannot be modulated at a high speed (higher than 1 kHz).

SUMMARY OF THE INVENTION

It is therefore an object of the present invention to provide a variable wavelength optical filter capable of modulating the transmission center wavelength at a high speed.

In accordance with the present invention, a variable wavelength optical filter capable of tuning the transmission center wavelength by controlling the angle between an optical axis and a dielectric interference optical filter has a piezoelectric oscillation mechanism for feeding a control signal to at least one of the dielectric interference optical filter and optics defining the optical axis to thereby apply oscillation in the direction of the above angle.

Specifically, in accordance with the present invention, in a variable wavelength optical filter having the above capability, a light output portion and a light input portion are supported by a first support member, and define the optical axis. The dielectric interference optical filter is supported by a second support member. A rotation control mechanism causes at least one of the first support member and second support member to rotate to thereby tune the transmission center wavelength. An oscillation mechanism or causes at least one of the first and second support members to oscillate by feeding a control signal.

Also, in accordance with the present invention, in a variable wavelength optical filter having the above capability, a light output portion and a light input portion are supported by a first support member, and defines the optical axis. The dielectric interference optical filter is supported by a second support member. A rotation control mechanism causes at least one of the first and second support members to rotate to thereby tune the transmission center wavelength. A piezoelectric element applies oscillation to between the first and second support members and the dielectric interference optical filter by feeding a control signal.

Further, in accordance with the present invention, in a variable wavelength optical filter including a servo motor whose rotation angle is controlled by an electric signal and a dielectric interference optical filter mounted on a rotary plate affixed to the output shaft of the servo motor, and capable of tuning a transmission center wavelength, the filter has a piezoelectric element for applying oscillation to the dielectric interference optical filter in the direction of the above rotation angle by feeding a control signal.

Moreover, in accordance with the present invention, in a variable wavelength optical filter capable of tuning a transmission center wavelength by controlling the angle between an optical axis and an optical filter, a piezoelectric oscillation mechanism feeds a control signal to at least one of the optical filter and optics defining the optical axis to thereby apply oscillation in the direction of the above angle.

BRIEF DESCRIPTION OF THE DRAWINGS

The above and other objects, features and advantages of the present invention will become apparent from the following detailed description taken with the accompanying drawings in which.

In the figures, identical reference numerals designate identical structural elements.

DETAILED DESCRIPTION OF THE PREFERRED EMBODIMENTS

Figure 1:
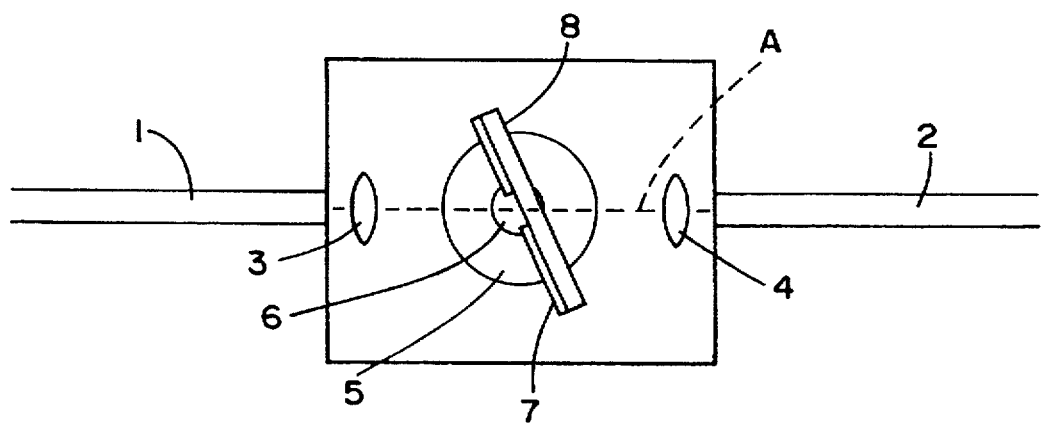
FIG. 1 is a view showing a conventional variable wavelength optical filter.

To better understand the present invention, a brief reference will be made to a conventional variable wavelength optical filter, shown in FIG. 1. As shown, a wavelength multiplexed optical signal propagated through an optical fiber 1 is introduced into the filter. In the filter, a lens transforms the optical signal to parallel light. The parallel light is incident to a dielectric interference optical filter 8. The filter 8 is mounted on a rotary plate 7 affixed to the output shaft 6 of a servo motor 5. The angle of the filter 8 to the input optical signal is variable in response to an electric signal fed from the outside of the filter. A change in the angle of the filter 8 to the optical signal causes the thickness of the filter to change in the direction of the optical axis, resulting in a change in transmission wavelength. Stated another way, the wavelength to be transmitted through the filter 8 can be tuned by the electric signal fed to the filter from the outside. The optical signal selected by the filter 8 is again converged by a lens 4 into an optical fiber 2.

However, the conventional optical filter cannot modulate the transmission center wavelength at a high speed, i.e., at a frequency higher than 1 kHz, as discussed earlier.

Figure 2:
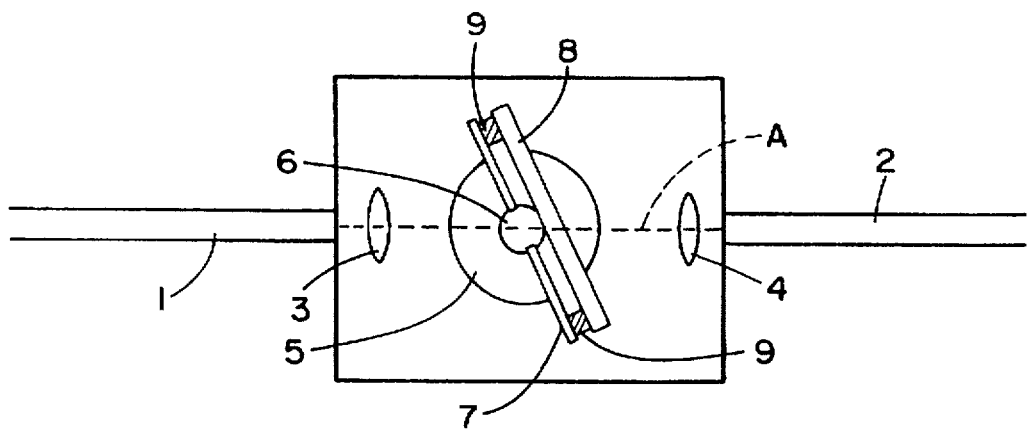
FIG. 2 is a view showing a variable wavelength optical filter embodying the present invention.

Referring to FIG. 2, a variable wavelength optical filter embodying the present invention is shown. As shown, the filter has a lens 3 positioned at the output end of an optical fiber 1 in order to transform input optical signal to parallel light. A dielectric interference optical filter 8 is located at the rear of the lens 3 in the direction of light propagation. The filter 8 transmits, among the incident light, only the light of particular wavelength. A lens 4 is positioned at the rear of the filter 8 in the above direction in order to converge the parallel light output from the filter 8 into the input end of an optical fiber 2. A servo motor 5 has an output shaft 6 and has its rotation angle controlled by an electric signal fed from the outside of the filter. A rotary plate 7 is affixed to the output shaft 6 of the motor 5. The filter 8 is mounted on the rotary plate 7 with the intermediary of piezoelectric elements 9.

Figure 3:
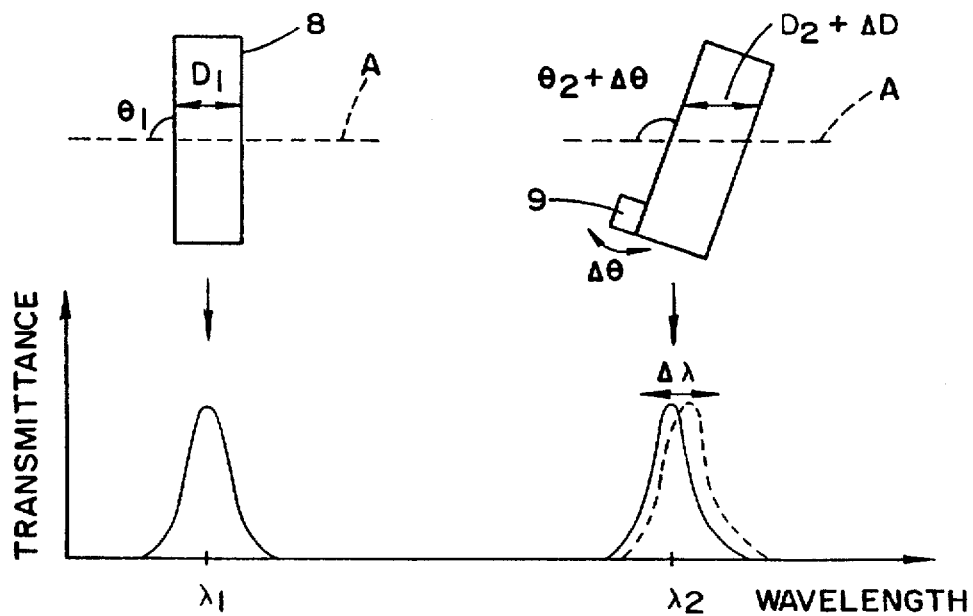
FIGS. 3, 4, 5 and 6 are views each showing an alternative embodiment of the present invention.

A reference will also be made to FIG. 3 for describing the operation of the above embodiment. FIG. 3 shows a relation between the rotation angle θ of the filter 8 to the optical axis A and a wavelength transmission characteristic. As shown, when the rotation angle of the filter 8 to the optical axis A is θ1, the thickness of the filter 8 as measured in the direction of the optical axis A is D1. That is, the filter 8 forms an interference filter having a cavity whose entire length is D1. In this condition, the maximum transmittance is set up at a particular wavelength λ1. When the filter 8 is rotated from the angle θ1 to an angle θ2, its thickness as measured in the above direction varies to D2. As a result, the peak of transmittance varies from λ1 to λ2. This means that if the servo motor 5 is controlled by an electric signal fed from the outside, then it is possible to adjust the angular position of the filter, i.e., to tune the transmission center wavelength of the same. Further, in the illustrative embodiment, an electric signal for modulation is applied to the piezoelectric elements 9. In response, the filter 8 oscillates over a displacement of ±Δθ with respect to the optical axis A. As a result, the thickness of the laminate film varies over ±ΔD in the direction of the optical axis A, so that the peak of the transmittance is modulated by the displacement Δλ. Because the modulation frequency band of a piezoelectric element usually extends as far as several ten kilohertz, it is possible to realize high-speed modulation higher than 1 kHz.

Figure 4:
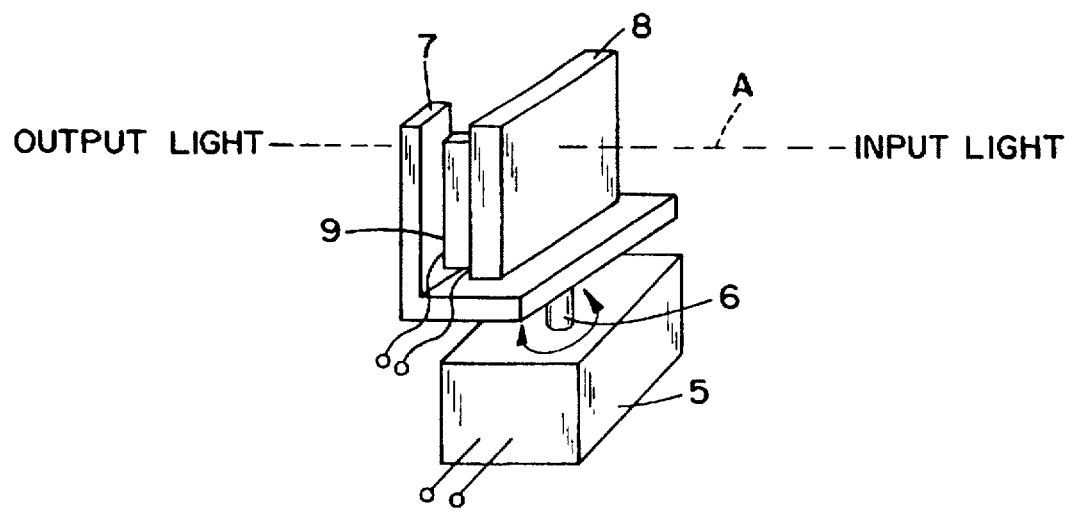

FIG. 4 shows an alternative embodiment of the present invention. As shown, a support is affixed to the output shaft 6 of the servo motor 5. The rotary plate 7 is mounted on the support and includes an upright portion. The filter 8 is mounted on the rotary plate 7 via a single piezoelectric element 9, i.e., cantilevered to the plate 7. By contrast, in the previous embodiment, the filter 8 is mounted on the rotary plate 7 at opposite ends thereof via the piezoelectric elements 9. With the cantilevered filter 8, it is also possible to tune the transmission center wavelength by feeding a control signal to the servo motor 5 from the outside. Again, an electric signal is applied to the piezoelectric element 9. As a result, oscillation is imparted from the piezoelectric element 9 to one end of the filter 8, thereby implementing the modulation of the transmission center wavelength.

Figure 5:
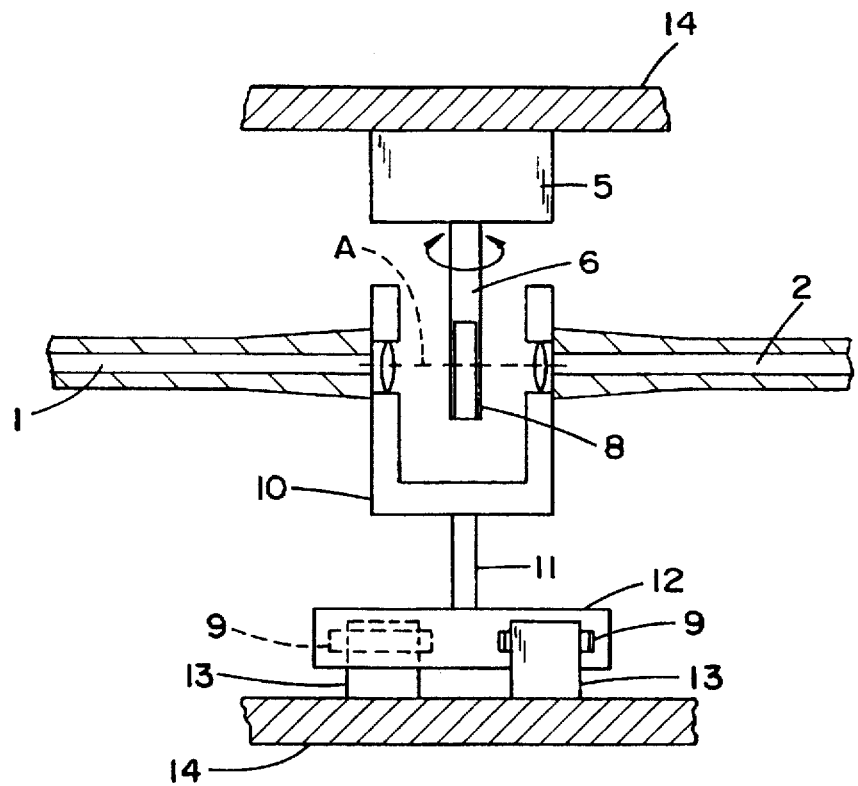

Referring to FIG. 5, another alternative embodiment of the present invention will be described. As shown, the output end of the fiber 1 and the input end of the fiber 2 are held by a holder 10 having a generally U-shaped section. Support members 13 extend upward from a wall 14 included in a casing. Members 11 and 12 are affixed to the support member 13 in an inverted T-shaped configuration via the piezoelectric members 9. The bottom of the holder 10 is supported by the support members 11 and 12. The dielectric laminate film optical filter 8 is affixed to the output shaft 6 of the servo motor 5 which is affixed to another wall 14 of the casing. In operation, the servo motor 5 is controlled to rotate the filter 8 relative to the optical axis A such that the filter 8 is tuned to a desired transmission center wavelength. For the modulation of the transmission center frequency (displacement of ±Δθ), the oscillation of the piezoelectric elements 9 is transferred to the output end of the fiber 1 and the input end of the fiber 2 via the T-shaped members 11 and 12 and U-shaped holder 10.

Figure 6:
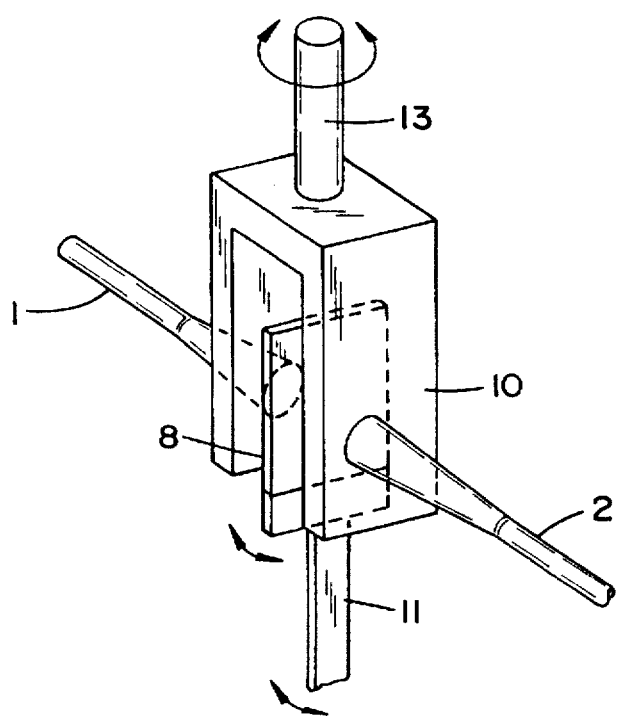

FIG. 6 shows a further embodiment of the present invention. As shown, this embodiment is essentially similar to the embodiment shown in FIG. 5, except for the following. The holder 10 holding the output end of the fiber 1 and the input end of the fiber 2 is turned upside down and has its bottom wall affixed to a rotatable member engaged with the output shaft, not shown, of the servo motor, not shown. The filter 8 is supported by the support member 11 which is connected to an oscillation transmission mechanism similar to the mechanism shown in FIG. 5. In this configuration, the servo motor controls the optical axis formed by the optics while the piezoelectric elements, not shown, cause the filter 8 to oscillate.

The crux of the present invention is that a vibration mechanism be provided independently of a rotation mechanism for varying the relative angle between the optical filter and the optics defining the optical axis. This effectively realizes both the tuning and the oscillation over a preselected displacement. In this sense, only the optics may be provided with the rotation mechanism and oscillation mechanical, if desired. Alternatively, both the optical filter and the optics defining the optical axis may be provided with the oscillation mechanism.

Figure 7:
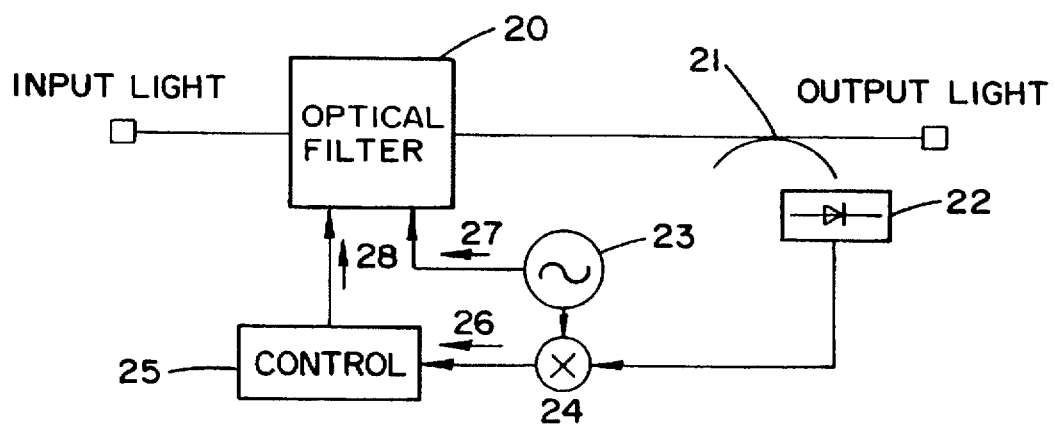
FIG. 7 is a block diagram schematically showing a specific control circuit using the characteristic of the variable wavelength optical filter in accordance with the present invention.

FIG. 7 shows a specific control system using the characteristic of the optical filter in accordance with the present invention. As shown, a variable wavelength optical filter 20 includes a piezoelectric element or elements, not shown. A modulating signal 27 generated by an oscillator 23 is applied to the piezoelectric elements in order to modulate the transmission center wavelength. The resulting output light of the filter 20 is split by a photocoupler 21 and partly fed to a photodiode 22. In response, the photodiode 22 demodulates the incident light to produce a corresponding electric signal. A multiplier 24 multiples the electric signal output from the photodiode 22 and the output signal of the oscillator 23, thereby producing a phase error signal 26. The phase error signal 26 is zero when the transmission center wavelength of the filter 20 is coincident with the wavelength of the signal light. Therefore, if a control 25 controls the rotation angle of the filter 20 with a control signal 28 such that the phase error signal 26 is zero at all times, then the transmission center wavelength can remain coincident with the waveform of the signal light.

What is claimed is:

1. A variable wavelength optical filter including a servo motor whose rotation angle is controlled by an electric signal and a dielectric interference optical filter mounted on a rotary plate affixed to an output shaft of said servo motor, and capable of tuning a transmission center wavelength, said filter comprising two piezoelectric elements located between said rotary plate and said dielectric interference optical filter at opposite ends of said dielectric interference optical filter for applying oscillation to said dielectric interference optical filter in a direction of said rotation angle by feeding a control signal.

* * * * *